United States Patent [19]

Nakauchi et al.

[11] 3,825,728

[45] July 23, 1974

[54] MAGNETIC CARD READER

[75] Inventors: Shunsaku Nakauchi, Mitaka; Masanori Hirasawa, Tokyo, both of Japan

[73] Assignee: Tokyo Magnetic Printing Co., Ltd., Tokyo, Japan

[22] Filed: Mar. 8, 1973

[21] Appl. No.: 339,220

[30] Foreign Application Priority Data

Mar. 14, 1972 Japan .............................. 47-25212

[52] U.S. Cl. .................... 235/61.11 D, 235/61.7 B, 340/347 NT

[51] Int. Cl. .......................... G06k 7/08, G11b 5/68

[58] Field of Search ............ 235/61.11 D, 61.12 M, 235/61.7 B, 61.11 E; 340/146.3 H, 146.3 AG, 146.3 C, 347 NT; 330/109

[56] References Cited

UNITED STATES PATENTS

| | | | |
|---|---|---|---|
| 2,658,958 | 11/1953 | Wells | 330/109 |
| 3,213,298 | 10/1965 | Luke | 340/347 NT |
| 3,612,834 | 10/1971 | Arikawa et al. | 235/61.11 D |
| 3,676,644 | 7/1972 | Vaccaro et al. | 235/61.11 D |

OTHER PUBLICATIONS

Villante: "Automatic Threshold Control Circuit", IBM Technical Disclosure Bulletin, Vol. 5, No. 6, November 1962, pages 55–56.

*Primary Examiner*—Thomas A. Robinson
*Attorney, Agent, or Firm*—Wolfe, Hubbard, Leydig, Voit & Osann, Ltd.

[57] ABSTRACT

A magnetic card reader for reading out digital code recorded magnetically on a card independently of variations in card velocity. A clock pulse signal is also recorded on the card and the reader reads out the digital code and clock pulse signal simultaneously and in synchronism with each other. The digital code and clock pulse signal are compared at a constant level in a detecting device so that only accurate digital code signals are read. The detecting device comprises amplifiers which reduce the degree of amplification in proportion to input frequency increases and which are connected respectively to each magnetic head and an AND circuit to which the amplifier ouputs are synchronously applied after being level-sensed.

5 Claims, 17 Drawing Figures

MAGNETIC CARD READER

This invention relates to magnetic card readers.

There has been generally used a magnetic card reading system wherein a digital code is recorded magnetically on a card and is read out so that the bearer of said card will be identified.

Code reading devices for such magnetic cards have included those types wherein the card is fed with a capstan moved by a motor, with a spring and the like means. However, each has defects in that the mechanism for passing the card through the magnetic head for the readout at a constant feeding speed is complicated and costly and is troublesome to maintain. A primary object of the present invention is to improve the electric read-out mechanism in the card readers referred to so that the mechanical magnetic card feeding mechanism can be omitted, so that the entire mechanism is simplified and the above mentioned defects are eliminated.

A further object of the present invention is to provide a magnetic card reader wherein the mechanism of reading out magnetic cards is made so simple that the reliability of the entire system is high.

Another object of the present invention is to provide a magnetic card reader wherein the effect of a dropout by an inadvertent contact of the magnetic head with the magnetic card is eliminated and yet the mechanism is so simple that the entire cost can be greatly reduced.

The present invention shall be explained with reference to the accompanying drawings, in which.

Figure 1:
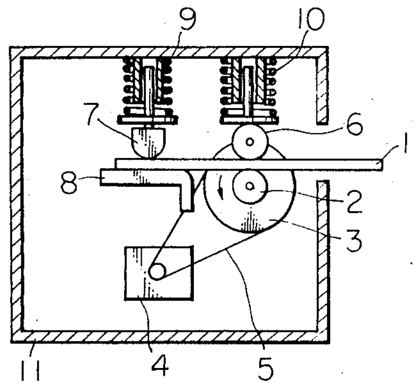
FIG. 1 is a schematic cross sectional view showing a conventional reading mechanism.

In FIG. 1 which shows a conventional reading-out mechanism in a system of the kind referred to, 1 is a magnetic card, 2 is a capstan for feeding the magnetic card, 3 is a wheel disposed coaxial with the capstan 2, 4 is a motor for driving the capstan 2 through a belt 5 hung between the motor shaft and said wheel 3, 6 is a pinch roller, 7 is a magnetic head, 8 is a magnetic card receiving stand, 9 is a spring for pressing the magnetic head 7 against the magnetic card 1 on the stand 8, 10 is a spring for pressing the pinch roller 6 toward the capstan 2, and 11 is a housing.

With the arrangement of FIG. 1, a magnetic card 1 manually inserted by an operator to the capstan 2 is held between the capstan 2 and the pinch roller 6 so as to be fed toward the magnetic head 7, so that the code signals on the magnetic card will be read out while the latter is passed at a constant velocity through the position where the card contacts the magnetic head 7.

Figures 2A, 2B:
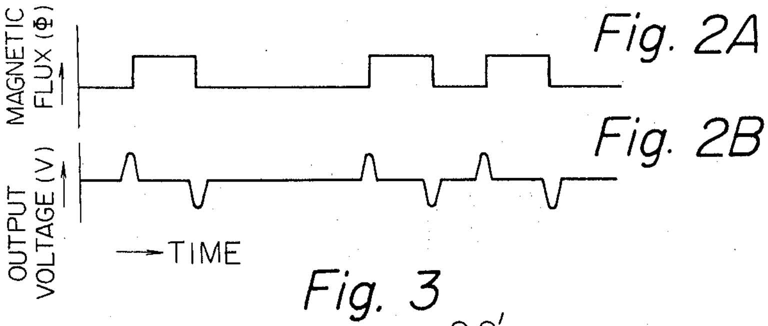
FIGS. 2A and 2B show diagrams of wave forms in the mechanism of FIG. 1.

FIGS. 2A and 2B are wave forms showing the relation between the code signals recorded on the card and the read-out output voltage from said code signals. FIG. 2A is the wave form showing variations of magnetic flux as a function of time at the magnetic head as caused by the code signals recorded on the magnetic card which passes the magnetic head at a constant rate, wherein the abscissa represents the time and the ordinate represents the magnetic flux. In the present instance, the wave shows that code signals of "1011" are recorded. In this case, the intervals between the respective bits of the signals shown in the wave form are constant.

FIG. 2B shows a wave form of output voltage from the magnetic head in the case where the magnetic card on which the code signals as shown in FIG. 2A are recorded is inserted into the apparatus of FIG. 1 and is passed under the magnetic head at a constant velocity by the card feeding mechanism, wherein the abscissa represents time and the ordinate represents the flux. This output generates a voltage proportional to the time variation or $d\Phi/dt$ of the magnetic flux $\Phi$ generated by the magnetic card in the gap of the magnetic head. In this case, as the velocity of the magnetic card is constant, $d\Phi/dt$ will be constant and, therefore, the magnitude of the generated voltage will be constant. Therefore, if the presence or absence of a pulse is judged on a level of a constant magnitude, the code of the magnetic card can be read out.

However, in order to move the magnetic card at a constant velocity, a complicated mechanism is required, leading to many problems.

In the present invention, in order to eliminate these defects, all complicated mechanisms such as a constant velocity card feeding mechanism are eliminated. The reading mechanism comprises only a pair of magnetic heads and a mechanism for pressing together the magnetic head and the magnetic card. The code signals and also clock pulse signals of a constant cycle synchronized with the code signals are recorded in parallel with each other on the magnetic card. These code signals and clock pulse signals are read out when an operator inserts such magnetic card into the mechanism so that the two signals will be simultaneously traced by the magnetic heads. Such problems as are caused by the fluctuations of the wave form and voltage read out due to possible variations in the inserting velocity are solved by designing the electric reading-out circuit to reproduce the read-out code as accurate code signals.

Figure 3:
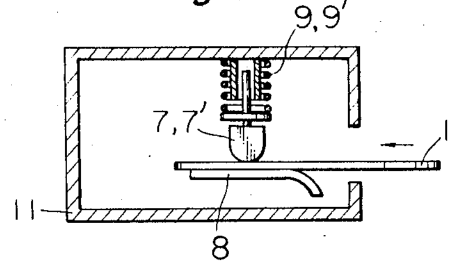
FIG. 3 is a schematic cross sectional view showing a reading mechanism of the present invention.

In FIG. 3, showing schematically a reading mechanism of the present invention, the constant speed magnetic card feeding mechanism is omitted and the reading mechanism comprises only a pair of magnetic heads 7 and 7′ disposed transversely to the card inserting direction, a magnetic card receiving station 8, springs 9 and 9′ for urging the magnetic heads 7 and 7′ toward the station 8, and a housing 11. When the magnetic card 1 is manually inserted to a fixed position between the magnetic heads 7, 7′ and the magnetic card receiving stand 8, the magnetic code signals and clock pulse signals will be simultanelusly read out by the respective magnetic heads 7 and 7′. The inserting velocity may fluctuate widely depending on the operator and, therefore, the signals read out by the magnetic heads may also fluctuate widely.

Figure 4A:
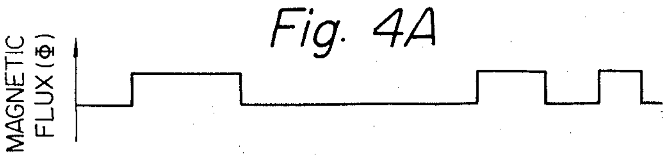
FIGS. 4A and 4B are diagrams showing wave forms in the mechanism of the present invention in FIG. 3.
Figure 4B:
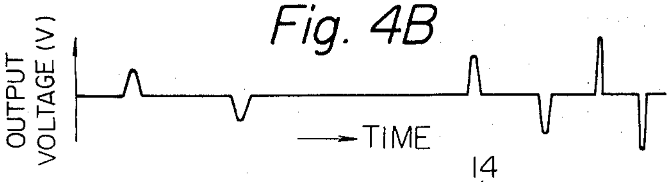

FIGS. 4A and 4B show in wave form diagram the relation between the recorded code signals and the output voltage in the card reader according to the present invention.

In particular, FIG. 4A is a wave form showing variations with time of the magnetic flux in the gap of the magnetic head when the magnetic card is inserted into the device for code reading. The abscissa represents the time and the ordinate represents the magnetic flux. In this case, the velocity at which the card is passed through the heads is not constant and, therefore, even the card on which the same digital code signals 1011 as in the case of FIG. 2A are recorded will show variations of the magnetic flux as illustrated in FIG. 4A. Next, FIG. 4B shows the output voltage of the magnetic head representing the code signals, wherein the abscissa represents time and the ordinate represents the voltage. Thus the output voltage has a wave form proportional to $d\Phi/dt$ and the width, interval and height of the respective pulses are different.

Therefore, with the wave form of FIG. 4B as it is, it is difficult to judge whether the signal pulse is present or not at a fixed voltage level. For this reason, it becomes necessary to render this read-out voltage constant regardless of variations in the velocity of the magnetic card. The present invention solves this problem by arranging the electric circuit for the signal reading-out as detailed below. On the other hand, the presence or absence of signal pulses is detected by the cycle of code signal which is originally constant so as to be independent of the card velocity. For this purpose, according to the present invention, the read-out code signal is compared with the clock pulse signal recorded on the magnetic card in synchronism with the cycle of the code signal so that the code signal can accurately read.

Figure 5:
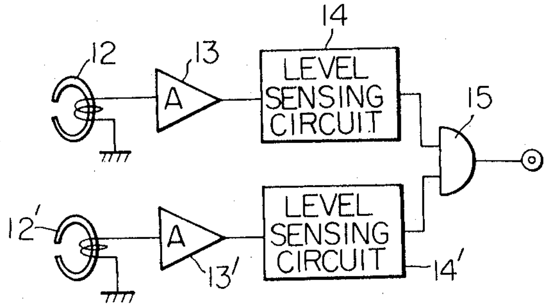
FIG. 5 is a block diagram showing an embodiment of a reading circuit according to the present invention.

FIG. 5 shows a block diagram of an embodiment of the reading device of the present invention, wherein 12 is a magnetic head for reading the code signal from the card, and the output from the magnetic head 12 is applied to an amplifier 13. According to the present invention, this amplifier is of the type that reduces the degree of amplification with increase in input frequency. For this purpose, it is preferable to use an amplifier in which the rate of reduction of amplification is substantially $-6db/oct.$, that is, when the input frequency doubles, the amplification is halved. 14 is a level sensing circuit wherein, when the input voltage level becomes higher than a certain value, an output of a constant voltage level will appear. 15 is an AND circuit. The magnetic head 12' is used to read out the clock pulse signal. The clock pulse signal read by the head 12' is transmitted to the AND circuit 15 through an amplifier 13' and level sensing circuit 14' of the same type as referred to above, at a constant voltage level and in synchronism with the output from the level sensing circuit 13.

Figure 6:
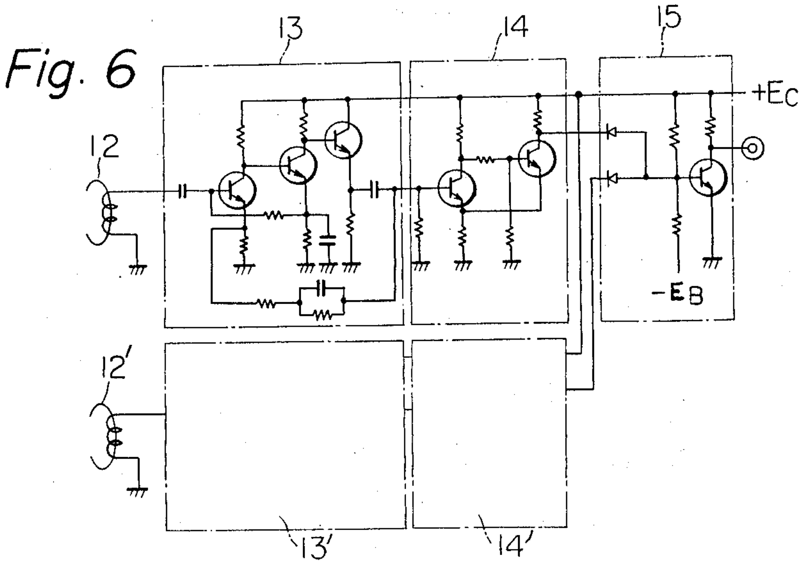
FIG. 6 is a circuit diagram of a practical embodiment of the circuit in FIG. 5.

FIG. 6 shows a practical embodiment of the block diagram shown in FIG. 5.

In the circuit of FIG. 6, the parts shown by reference numerals 12, 12', 13, 13', 14, 14' and 15 respectively correspond to those parts identified by the same reference numerals in FIG. 5. That is, 12 is the magnetic head for reading the code signal from the magnetic card, 13 is the amplifier whose amplification degree is lowered with increases in the input frequency, and, in the present instance, this amplifier is an equalizer amplifier comprising three transistors and a negative feedback circuit which increases the feedback as the frequency rises. The feedback circuit comprises a resistance and a condenser, and 14 is a Schmitt trigger circuit which, when an input signal of a level above a fixed level is applied thereto, applies a high level output voltage to a NAND gate circuit 15 comprising two diodes and a transistor. 12' is the magnetic head for reading the clock pulse signal from the magnetic card, and 13' and 14' are exactly the same as the above described circuits 13 and 14. In the circuit 15, the output voltages from the Schmitt trigger circuits 14 and 14' are applied to the cathode sides of the two diodes so that these diodes will be in OFF state only when the voltages from the circuits 14 and 14' are of high level and consequently, the transistor will be ON so that the output voltage from the circuit 15 will be of low level. That is, the circuit 15 operates as a NAND gate in the present embodiment, while the circuit can be made to operate as an AND gate circuit by providing an inverter at the output side of the circuit 15.

The operation of the circuit in FIG. 5 will be referred to next.

Figures 7A, 7B, 7C, 7D, 7E:
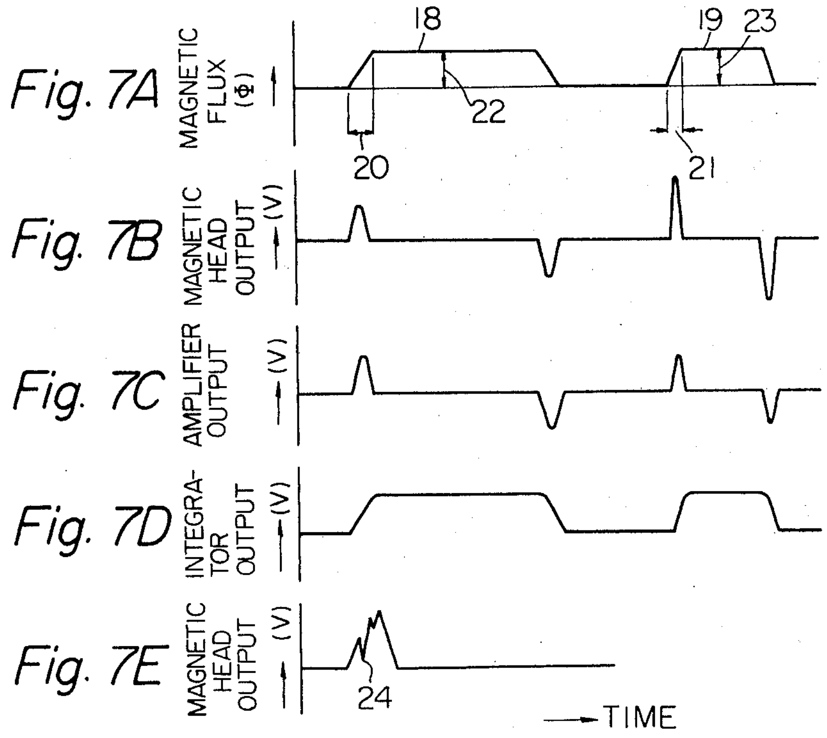
FIGS. 7A–7E are diagrams showing wave forms in the circuit of FIG. 5.

In FIG. 7A, there is shown a variation of the magnetic flux at the gap of the magnetic head 12 or 12' due to the code signal or the clock pulse signal when the velocity of the magnetic card is varied. In the case of this wave form shown, there is shown a part representing 11 of the code signal. In this wave form, further, 18 is a flux wave form when the card velocity is relatively low, and 19 is a flux wave form when the card velocity is relatively high. The abscissa represents the time and the ordinate represents the magnitude of the magnetic flux $\Phi$. As seen in the wave form of FIG. 7A, if the velocity of the card varies, the rise times 20 and 21 for the magnetic flux will vary but the magnitudes 22 and 23 of the magnetic fluxes are constant. If such magnetic flux variation is presented to the respective magnetic heads 12 and 12', an output as is shown in FIG. 7B will be obtained from each head pulse magnitude and frequency both increase in proportion to the card velocity.

Therefore, as shown in FIG. 5, if the respective outputs from the heads 12 and 12' are amplified in inverse proportion to the frequency, the height of the voltage will become substantially constant irrespective of the card velocity as shown in FIG. 7C.

The code signal pulses and clock pulses are thus read out, their voltage levels are sensed respectively by the level sensing circuits 14 and 14' and only the signalling pulses higher than a predetermined voltage level are provided to the AND circuit 15 in synchronism with each other. Thus the code signal pulses and the clock pulses are compared with one another in the circuit and only the code signals can be taken out at the output end of the circuit 15.

It is presumed that, as long as the card is manually inserted into the card reader, its velocity will fluctuate over a wide range depending on the operator. Therefore, the output voltage of the magnetic head will also fluctuate over a wide range. However, if the above described device according to the present invention is used, the output voltage of the magnetic head can be made constant irrespective of the fluctuating card velocity and thus the presence or absence of code signal pulses can be accurately detected.

Figure 8:
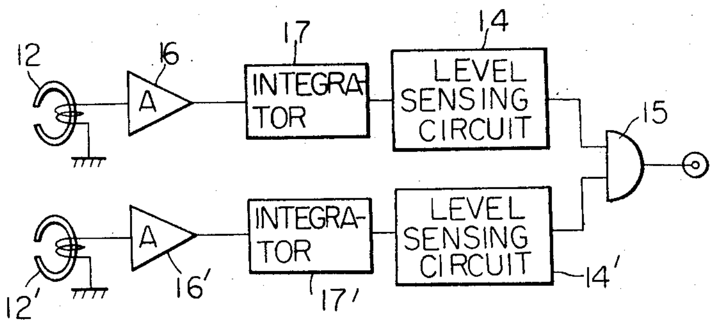
FIG. 8 is a block diagram of another embodiment of the present invention.

In FIG. 8, another embodiment of the present invention is shown. In the drawing, 12 and 12' are magnetic heads for reading the code signal and clock pulse signal, respectively, from the magnetic card in the same manner as in the case of FIG. 5 or 6. The outputs from these heads are provided respectively to amplifiers 16 and 16' which are, in the present instance, of the ordinary type, that is, having substantially a constant amplification degree. The respective outputs from such amplifiers 16 and 16' are then provided respectively to, in the present instance, integrators 17 and 17', the outputs from the integrators 17 and 17' are applied respectively to the level sensing circuits 14 and 14' and the outputs from the level sensing circuits are applied synchronously to the AND circuit 15.

Figure 9:
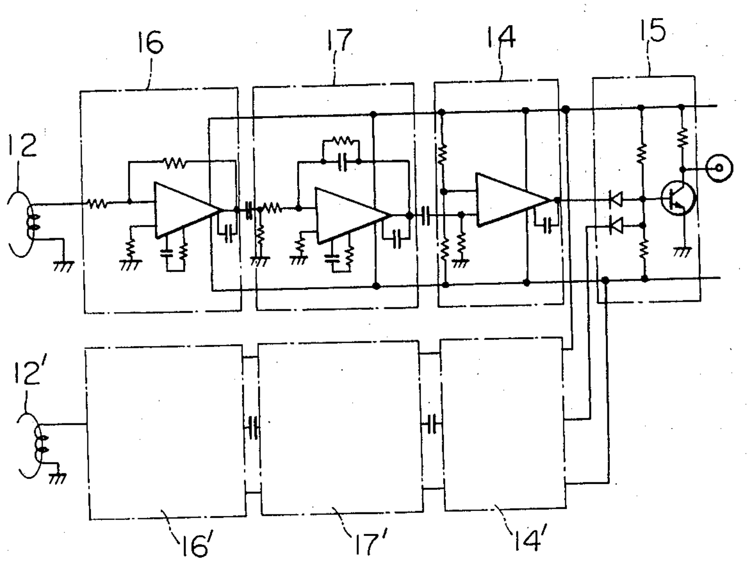
FIG. 9 is a circuit diagram showing a practical embodiment of the circuit in FIG. 8.

FIG. 9 shows an exemplary practical circuitry diagram of the embodiment of FIG. 8. In the circuit of FIG. 9, the parts shown by reference numerals 12, 12', 16, 16', 17, 17', 14, 14' and 15 corresbond to those circuits having the same reference numerals in FIG. 8. That is, 12 is the magnetic head to read the code signal on the magnetic card, 16 is the amplifier having a constant amplification degree using, in the present instance, an IC for DC amplifying, and 17 is the integrator comprising a DC amplifying IC, a condenser connected across the input and output terminals of the IC, a coupling condenser inserted between the amplifier 16 and the integrator 17 and a resistance inserted between the coupling condenser and the input terminal. 14 is the level sensing circuit including a DC amplifying IC having two input terminals, one of which receives a standard voltage applied through a bleeder resistance and the other of which receives an output from the integrator 17. The level sensing circuit 14 applies a high level output voltage to the NAND gate circuit 15 when the output voltage from the integrator 17 is above the standard voltage. The NAND gate circuit 15 comprises two diodes and a transistor arranged in the same manner as FIG. 6. It will be noticed that this NAND gate circuit 15 may be also adapted to operate as an AND gate circuit if a single stage inverting circuit is provided at the output side of the circuit 15. 12' is the magnetic head to read the clock pulse signal, and 16', 17' and 14' are exactly the same as the above circuits 16, 17 and 14, respectively.

The operation of the device in FIG. 8 or 9 shall be explained with reference to FIG. 7.

The code signal and clock pulse signal as shown in FIG 7A are read by the magnetic heads 12 and 12' to produce wave forms such as shown in FIG. 7B. When these signals are first amplified by the ordinary amplifiers 16 and 16' and subsequently applied to the integrators 17 and 17', an output voltage such as shown in FIG. 7D, which substantially corresponds to the original wave form of FIG. 7A, is obtained at the outputs of the respective integrators. By providing these integrator outputs to the AND circuit 15 through the level sensing circuits 14 and 14', an accurate code signal is obtained at the output of the circuit 15 independently of the card velocity in the same manner as in FIG. 5.

Since the card is inserted manually, the velocity will vary in a range of about 1 to 300 cm/sec. Therefore, in order to reproduce the original wave form of FIG. 7A with the integrator independently of velocity variations in such a wide range, it is desirable that the time constant CR of the integrator be about 0.04 to 4 ms.

Further, if the integrator is used, even when the contact between the magnetic head and magnetic card is prevented by the presence of dust or the like, causing a drop-out as is shown by 24 in the exemplary wave form of FIG. 7E in the output of the magnetic head, substantially no variation will be produced in the wave form or the output of the integrator.

While fluctuations in the card velocity as the card passes the magnetic head appear as fluctuations in the output voltage from the magnetic head, any effect on the detection of code signal pulses due to such fluctuations can be easily prevented according to the present invention. Since, on the other hand, the detected code signal pulses include differences in the pulse interval due to the card speed fluctuations, it is impossible to detect the presence or absence of code signal pulses recorded at a regular cycle or interval, consequently, the clock pulses are also recorded at regular intervals synchronized with those of the code signals on the magnetic card. These pulses are simultaneously read by a magnetic head and, after removing voltage fluctuations due to the card speed fluctuations are compared with the code signal pulses read out, whereby the presence or absence of the code signal pulses can be detected.

Figures 10A, 10B:
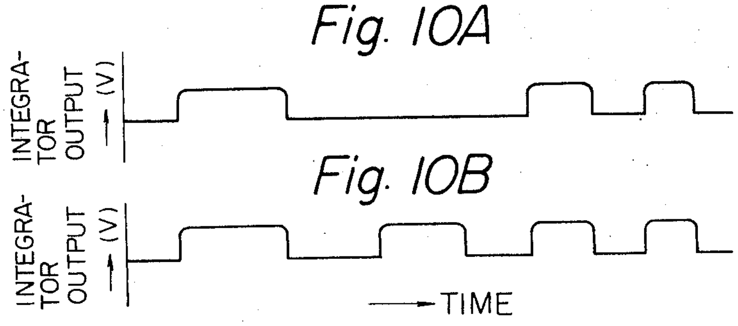
FIGS. 10A and 10B are diagrams showing the relation between code signal pulses and reference clock pulses in the present invention.

FIGS. 10A and 10B are wave form diagrams showing the relation between the above code signal pulses and the clock pulses–FIG. 10A shows an output wave form of the code signal after being passed through, in the case of FIG. 8, the integrator FIG. 10B shows an output wave form of the clock pulses after being passed through the same. It is evident that it can be easily detected that the signal of FIG. 10A means 1011 irrespective of fluctuations in the code signal pulse intervals due to fluctuations in the card speed, by comparing the wave forms as shown in FIGS. 10A and 10B.

What is claimed is:

1. In a magnetic card reader for reading digital codes wtih a magnetic head from magnetic cards on which at least two channels of desired signals for said codes and clock pulse signals synchronized with said code signals are recorded in parallel with each other, the combination comprising at least two magnetic heads for reading said code signals and clock pulse signals respectively from said two channels on the magnetic card and producing electrical outputs representing said respective signals, a detecting circuit for taking only said code signals out of the outputs from said magnetic heads after comparing said outputs with each other at a substantially constant level irrespectively of the velocity at which the magnetic card passes the magnetic heads, said detecting circuit comprising at least two amplifiers respectively connected to each of said magnetic heads for amplifying the respective electrical outputs therefrom, said amplifiers including means for reducing the degree of amplification of said outputs in proportion to a rise in the frequency of said outputs from the respective magnetic heads, level sensing circuits respectively connected to each other of said amplifiers for receiving the outputs therefrom and an AND circuit receiving the outputs from the respective level sensing circuits, a stand for receiving the magnetic cards as they are pushed past said magnetic heads at optional velocities, and means for pressing the magnetic heads against the magnetic cards as the cards pass said heads.

2. A magnetic card reader according to claim 1 wherein the amplification degree of the respective amplifiers is substantially −6*db/oct.*

3. In a magnetic card reader for reading digital codes with a magnetic head from magnetic cards on which at least two channels of desired signals for said codes and clock pulse signals synchronized with said code signals are recorded in parallel with each other, the combination comprising at least two magnetic heads for reading said code signals and clock pulse signals respectively from said two channels on the magnetic card and producing electrical outputs representing said respective signals, a detecting circuit for taking only said code signals out of the outputs from said magnetic heads after comparing said outputs with each other at a substantially constant level irrespectively of the velocity at which the magnetic card passes the magnetic heads, said detecting circuit comprising at least two integrators respectively connected to each of said magnetic heads for integrating said outputs from said magnetic heads, level sensing circuits respectively connected to each of said integrators for receiving the outputs from said integrators and an AND circuit receiving the outputs from the respective level sensing circuits.

a stand for receiving the magnetic cards as they are pushed past said magnetic heads at optional velocities, and means for pressing the magnetic heads against the magnetic cards as the cards pass said heads.

4. A magnetic card reader according to claim 3 wherein the time constant CR of said integrators is 0.04 to 4 ms.

5. A magnetic card reader according to claim 3 wherein said integrators also amplify the outputs from said magnetic heads.

* * * * *

UNITED STATES PATENT OFFICE
CERTIFICATE OF CORRECTION

Patent No. 3,825,728 Dated July 23, 1974

Inventor(s) Shunsaku Nakauchi et al.

It is certified that error appears in the above-identified patent and that said Letters Patent are hereby corrected as shown below:

Column 6, line 49, "wtih" should be -- with --.

Column 7, line 4, "other" should be canceled.

Signed and sealed this 4th day of February 1975.

(SEAL)
Attest:

McCOY M. GIBSON JR.
Attesting Officer

C. MARSHALL DANN
Commissioner of Patents